Figure 7:
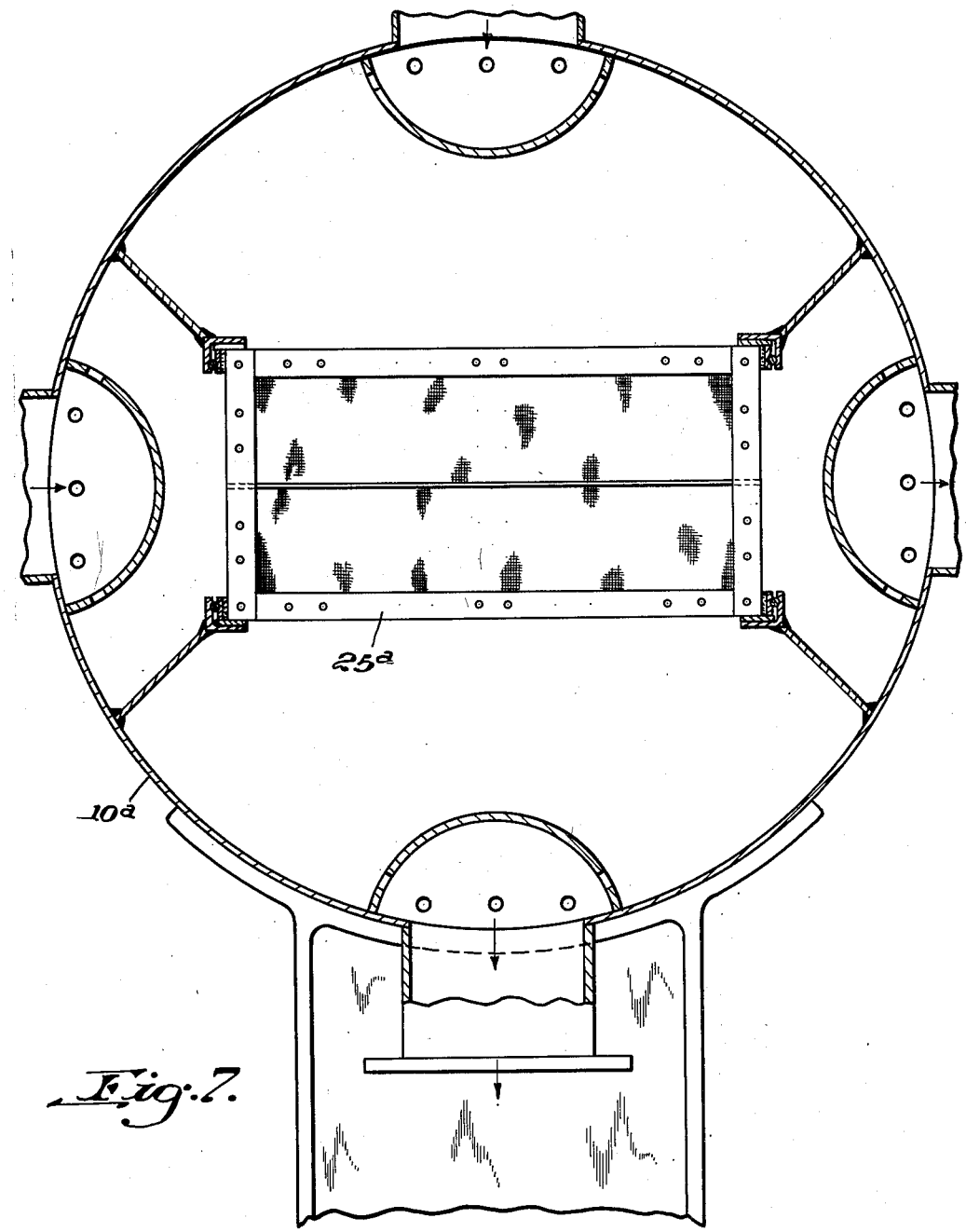

Nov. 18, 1952     E. V. HARLOW     2,618,357
FRAME DIFFUSION APPARATUS
Filed Feb. 11, 1949     2 SHEETS—SHEET 1
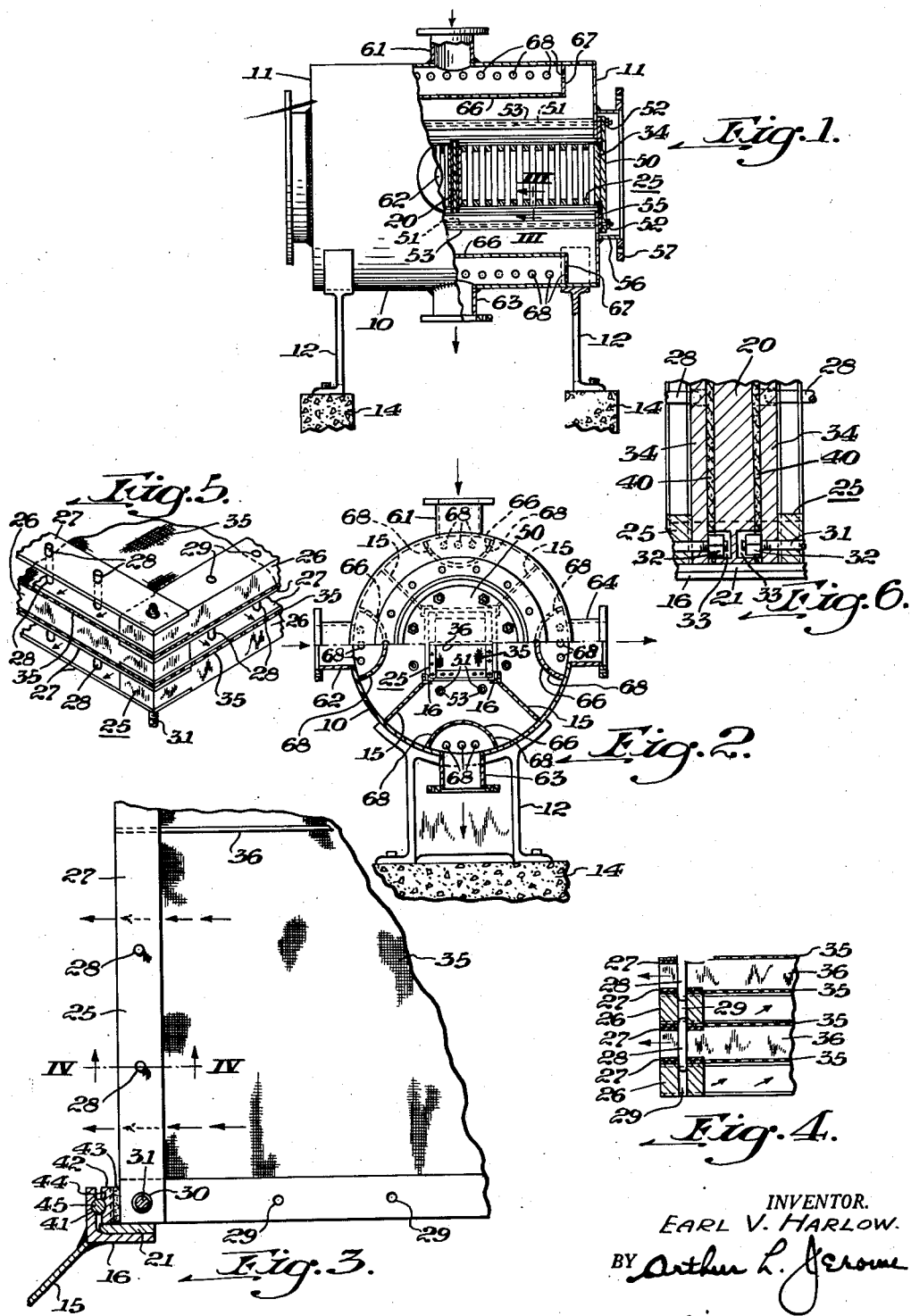
INVENTOR.
EARL V. HARLOW.
BY Arthur L. Jerome
his ATTORNEY.

Patented Nov. 18, 1952

2,618,357

UNITED STATES PATENT OFFICE 2,618,357

FRAME DIFFUSION APPARATUS

Earl V. Harlow, Beaver, Pa., assignor to Koppers Company, Inc., a corporation of Delaware Application February 11, 1949, Serial No. 75,954

6 Claims. (Cl. 183—2)

This invention relates to apparatus for the separation and concentration of gases by diffusion.

In the separation of a gas by diffusion, the feed gas is passed along one side of a porous diaphragm or boundary and a gaseous sweep medium is passed along the opposite side of the boundary. The constituent being separated from the feed gas passes through the boundary and the sweep medium acts to sweep the constituent away from the boundary. The rate of diffusion of the feed gas constituent in one direction through the porous boundary, and of the sweep medium in the other direction through the porous boundary is inversely proportional to the square roots of the molecular weights of the two gases, as explained in U. S. Patent 1,496,757, issued June 3, 1924, to W. K. Lewis et al., and in U. S. Patent 2,255,069, issued September 9, 1941, to C. G. Maier.

In addition to flow of gases through the porous boundary by diffusion, there will be a mass flow of gases through the boundary if there is a difference in the pressures on the gases on opposite sides of the boundary, and this will be true even if the pressure difference is relatively small, such as may be created by eddy currents or irregular flow conditions in the stream of gas on either face of the boundary. The flow of gas through the boundary, because of unequal pressures on opposite sides of the boundary, adds unwanted components of the feed gas to the sweep gas and reduces the efficiency of the separation process.

The volume of gas separated by diffusion is proportional to the area of the diffusion boundary, and to secure diffusion of large volumes of gas it is desirable to provide a diffusion boundary with a large area. The diffusion boundary is usually in the form of a thin porous or perforated sheet so the boundary has little mechanical strength and is relatively flexible. Hence, if the boundary material is employed in large sheets, it is difficult to keep it rigid and it may bulge or vibrate, thereby disturbing flow conditions on the faces of the boundary so that unequal pressure conditions may be created which will cause objectionable flow of gas through the boundary.

Furthermore, as the feed gas mixture flows across the face of a diffusion boundary, the composition of the mixture changes because of diffusion of one of the components of the mixture through the boundary. Hence, if a boundary of large dimensions is employed, the efficiency of the apparatus is reduced because of depletion of the feed gas before the feed gas reaches the portion of the boundary adjacent the exit end of a unit.

Similarly, as the sweep medium flows across the face of a boundary a constituent of the feed gas diffusing through the boundary builds up in the sweep medium. If the boundary is too large, the concentration of this gas constituent in the sweep medium will increase to such a degree that there will be objectionable counter-diffusion of this constituent from the sweep medium side of the boundary to the feed gas side of the boundary, thus reducing the effectiveness of the apparatus.

It has heretofore been proposed to provide a diffusion unit in which there are a plurality of diffusion boundaries in the form of flat sheets spaced apart a short distance with their faces confronting, and to arrange the flow of feed gas through alternate spaces or passages between boundaries, and to cause the sweep gas to flow through the remaining spaces or passages between the boundaries. A unit of this type is shown and claimed in application, Ser. No. 76,974, of F. A. Schwertz, filed February 17, 1949.

In the units of this type heretofore proposed the flow of feed and sweep gas has been either counter-current or concurrent. This has made it extremely difficult for the manifolds or headers through which gas is supplied to and discharged from the spaces between the boundaries to be arranged to insure uniform pressure conditions in all of the spaces or passages between different boundaries, and to insure that abnormal local pressure conditions will not develop because of irregular flow conditions.

An object of this invention is to provide an improved diffusion unit of large capacity.

A further object of the invention is to provide an improved diffusion unit of the type described which is arranged so that the headers or manifolds for controlling one of the two gases flowing through the unit do not interfere with the headers or manifolds for controlling the other of the two gases flowing through the unit.

Another object of the invention is to provide an improved diffusion unit of the type described which is arranged so that the feed and sweep gases passing therethrough flow at right angles to each other.

A further object of the invention is to provide an improved diffusion unit of the type described which employs rectangular diffusion boundaries and has the headers or manifolds for one of the gases at one pair of opposite margins of the boundary units, and has the headers or manifolds for the other of the gases at the other pair of opposite margins of the boundary units so that the manifolds or headers do not interfere with each other.

Another object of the invention is to provide an improved diffusion unit of the type described which incorporates a large number of boundary members and is arranged to support each of the boundary members rigidly and with the faces of the boundary members substantially parallel.

A further object of the invention is to provide an improved diffusion unit of the type described which is arranged so that the boundary elements may be quickly and easily removed and replaced when desired.

Another object of the invention is to provide an improved diffusion unit of the type described which is arranged to prevent undesired flow of gas around the margins of the boundaries.

A further object of the invention is to provide a diffusion unit of the type described having frames or spacers for holding the boundary elements in spaced parallel relationship, the frames or spacers being arranged to insure that adjacent spaces between boundary elements will be connected to different sets of manifolds or headers.

Another object of the invention is to provide a diffusion unit of the type described which can be constructed readily and at a minimum of expense.

A further object of the invention is to provide an improved diffusion unit of the type described which is arranged so that a plurality of boundary elements may be secured together as an assembly and may be installed and removed from the diffusion unit as a body.

Another object of the invention is to provide an improved diffusion unit of the type described which incorporates means to equalize and distribute the flow of gas to and from the headers so that the flow of gas approaching or leaving the boundary elements will be at a substantially uniform velocity throughout the surface of the element.

Other objects of the invention and features of novelty will be apparent from the following description taken in connection with the accompanying drawings in which, Fig. 1 is a side elevational view of a diffusion unit embodying my invention, with parts broken away and shown in section, Fig. 2 is an end elevational view of the unit shown in Fig. 1, with parts broken away and shown in section, Fig. 3 is an enlarged fragmentary sectional view taken along the line III—III of Fig. 1, Fig. 4 is an enlarged fragmentary sectional view taken along the line IV—IV of Fig. 3.

Fig. 5 is an enlarged fragmentary perspective view showing three of the frames employed in this unit, Fig. 6 is an enlarged fragmentary sectional view showing details of construction of this unit, and Fig. 7 is a sectional view of a modified form of unit embodying this invention.

Referring to Figs. 1 and 2 of the drawings there is shown therein one form of diffusion unit provided by this invention. As shown, the unit has a substantially cylindrical sheet metal shell indicated generally at 10, and closed at the ends by substantially flat circular heads 11. The shell 10 has secured to the exterior thereof supporting legs 12 which are adapted to rest upon concrete abutments 14 and thus support the shell 10 with its axis in a substantially horizontal plane.

The shell 10 has secured to the interior thereof four radially inwardly extending baffles or dividers 15 which are substantially equally spaced about the interior of the shell 10 and are disposed so that each divider extends substantially at 45° to the horizontal, as is best shown in Fig. 2 of the drawings. Each of the dividers 15 extends the entire length of the shell 10 and has its ends welded to the inner face of the heads 11, while the radially outer edge of each of the dividers is welded to the inner face of the shell 10. The dividers 15 cooperate to divide the interior of the shell 10 into four separate zones or chambers which, as hereinafter explained, are sealed from each other so that gas cannot flow between these chambers except through the diffusion area.

Each of the dividers 15 has secured to the radially inner edge thereof a section of angle iron 16, the arms or legs of which extend in substantially horizontal and vertical planes so as to define the corners of a rectangle which may be a square, as is apparent from Fig. 2. Each of the angles 16 is of such length as to extend the entire distance between the heads 11, and the ends of the angles are welded to the heads 11.

Each of the heads 11 has a substantially square centrally-located opening therein, this opening being of such size that the inner margin of the head is substantially in alignment with the inner faces of the arms of the angles 16.

A square or rectangular plate 20 is welded to the angles 16 substantially at the middle of these angles and serves to brace the angles 16 and the dividers 15. The plate 20 is of such size as to substantially fill the space between the angles 16.

As is best shown in Fig. 3, the horizontally extending arms of the two bottom angles 16 have flat bars 21 secured thereon to provide a smooth surface on which the frames may slide and are hereinafter described. The bars 21 have one corner relieved or cut away to clear the fillet which is usually present in an angle section. The bars 21 are secured in place by welding. The bars 21 are in sections and each section is of such length as to extend from the plate 20 substantially to the end of the angle on which the bar is mounted.

The angles 16 cooperate to form a rack or support to hold a plurality of frames each of which is indicated generally by the reference numeral 25. Each of the frames 25 is in the form of a hollow rectangle or square, the sides of the frame being relatively narrow, such as ¾ of an inch, and being of such length that the area enclosed by the frame is relatively large, such as 1 foot square. Each of the frames 25 is relatively thin, such as one-half an inch.

The construction of the frames 25 is best shown in Figs. 4 and 5 where it will be seen that each frame has one pair of opposite or parallel side rails in the form of closed members or solid bars 26, while the other pair of opposite or parallel side rails are in the form of thin strips 27 which are spaced apart far enough so that the exterior faces of these strips are in substantially the same plane as the faces of the bars 26. The ends of the bars 26 are recessed or cut away to receive the strips 27. The strips 27 and the bars 26 may be secured together in any desired manner, as by soldering.

The frames 25 are arranged in an assembly so that alternate frames have the closed sides or solid bars 26 located at the top and bottom and so that the intermediate frames have the closed sides or solid bars 26 located at the sides. The frames 25 are provided with indexing means to insure that they will always be arranged in this manner. The open sides of the frames formed by the strips 27 have a plurality of pins 28 associated therewith. These pins extend through aligned holes in the strips 27 and project from the faces of the strips 27 a distance somewhat less than one-half the thickness of one of the frames. The pins 28 are soldered or otherwise secured to the strips 27 so that the pins are held in position, and so that the pins hold the strips properly spaced apart. The closed sides of the frames formed by the solid bars 26 have holes therein, as indicated at 29, which are adapted to receive the pins 28 on an adjoining frame. The pins 28 and holes 29 cooperate to permit the frames to be assembled with the open sides formed by the strips 27 on one frame to lie against the closed sides formed by the solid bars 26 of an adjacent frame, but to prevent the frames being arranged so that the strips 27 on two adjacent frames are beside each other.

Each of the frames 25 has a hole 30 in each corner, while tie bolts 31 extend through these holes to secure the frames on each side of the plate 20 together in an assembly to facilitate installation and removal of the frames. The ends of the bolts 31 are threaded and have nuts 32 secured thereon. The nuts 32 on the inner ends of the bolts 31 are adapted to be received by recesses 33 in the faces of the plate 20, as is best shown in Fig. 6.

Each end of the assembly of frames is covered by a square plate 34 which has substantially the same external dimensions as one of the frames. The tie bolts 31 pass through holes in the corners of the plates 34 while the plates 34 have holes therein to receive the pins 28 which project from the faces of the frames 25 confronting the plates 34. The various parts of the unit are proportioned so that a selected number of frames 25, together with the end plates 34, form an assembly of such length as to substantially fill the space from one face of the center plate 20 to a head 11 of the unit, with the face of the end plate 34 substantially in alignment with the face of the head 11.

The side faces of the frames 25 are substantially flat and are adapted to have clamped between them the edges of the sheets of foraminous boundary material. The boundary material may be in the form of a sheet of fine metal screen, perforated metal plate, or cloth woven from spun glass. One form of material which may be employed for the barrier is "Lektromesh" produced by C. O. Jelliff Corp., of Southport, Conn. A suitable form of this material is about .007 of an inch thick, and has holes about .003 of an inch in diameter which make up about 23 percent of the surface area of the sheet. The sheets of boundary material are cut so as to be about the size of the external dimensions of the frames 25, while the marginal portions of the sheets have holes therein to receive the pins 28, and the tie bolts 31. A sheet of boundary material, as indicated at 35, is placed between each pair of frames.

Each frame has a centrally disposed brace 36 extending parallel to the solid or closed side bars 26, as is best shown in Fig. 3. Each brace 36 is in the form of a thin metal strip secured edgewise, and of such width that the edges of the brace are substantially in the plane of the faces of the sides of the frame. The ends of each brace 36 are recessed or cut away so that the ends of the brace extend between the strips 27 on the open sides of a frame, as is shown in Fig. 4. The braces 36 and the strips 27 may be secured together by any appropriate means, as by soldering. The ends of the braces 36 which extend between the strips 27 cooperate with the pins 28 to keep the strips 27 properly spaced and prevent deflection of these strips when the frames are drawn together to clamp the boundary sheets between the frames.

As adjoining frames are mounted substantially at right angles to each other, the braces 36 in adjacent frames are at right angles to each other. Hence, the brace 36 associated with the frame 25 on one side of a boundary 35 is disposed horizontally, while the brace 36 associated with the frame 25 on the other side of the same boundary 35 is disposed vertically. The braces 36 on opposite sides of a boundary 35 press against the faces of the boundary and hold it rigid so that it does not vibrate or move objectionably, while as hereinafter explained, the arrangement of the braces 36 is such that they do not interfere with flow of gas across the faces of the boundaries.

As explained above, the pins 28 and the ends of the cross braces 36 prevent deflection of the spaced strips 27 so these strips firmly press against the faces of the boundary sheets to hold the boundary sheets 35 against the solid bars 26 of the adjacent frame. Accordingly, the margins of the boundary sheets 35 are firmly clamped between the frames and there is no possibility of improper flow of gas from a passage at one side of a boundary around the margin of a boundary to the passage at the other side of the boundary.

The frames 25 with the boundary sheets 35 interposed therebetween, together with the end plates 34, are assembled externally of the shell 10 to form a unit which is of such size as to fill the space at one side of the plate 20. After the frames 25, boundary sheets 35 and end plates 34 have been assembled in the proper relationship, the tie bolts 31 are inserted in the holes 30 in the corners of the frames 25 and in the end plates 34, and the nuts 32 are installed and tightened to draw the frames together and clamp the margins of the boundary sheets 35 tightly between the frames so that gas will not flow between the frames and the boundary sheets.

After a number of frames 25 and boundary sheets 35 have been assembled into a unit and have been secured together by the tie bolts 31, the entire unit or assembly is placed in the shell 10. One of these units is readily installed by resting the inner end of the unit on the bars 21, and thereafter sliding the unit inwardly as far as it will go. A gasket 40, formed of compressible material, such as cork, is mounted against each face of the plate 20, and each of these is engaged by the face of an end plate 34 of a unit assembly to prevent flow of gas between the frame assembly and the plate 20.

This diffusion unit includes means for preventing flow of gas around the corners of the frames 25 between the chambers on opposite sides of the dividers 15. Referring to Fig. 3 of the drawings it will be seen that one arm of the angle 16 has a groove therein as indicated at 41, while a metal strip 42 is located between the arm of the angle 16 and the face of the frames 25. A gasket 43 formed of compressible material, such as cork or synthetic rubber, is located between the metal strip 42 and the face of the frames 25. Each of the strips 42 and each of the gaskets 43 is of such length as to extend substantially from the plate 20 to one of the heads 11. The face of the metal strip 42 confronting the arm of the angle 16 has a groove 44 therein which is substantially in alignment with the groove 41 in the face of the arm of the angle 16. A rod 45 slides in the grooves 41 and 44 in the arm of the angle 16 and in the face of the strip 42. The rod 45 is of such size as to tightly fit in the space provided so that it exerts force through the strip 42 to compress the gasket 43 against the face of the frames 25 and thereby provide an effective seal between the bar 42 and the face of the frames 25. Each of the rods 45 is of such length as to extend substantially from the plate 20 to one of the heads 11. Each of the rods 45 is tightly engaged throughout its length by the associated bar 42 and by an arm of the associated angle 16 so that an effective seal is provided to prevent flow of gas through the space between the bar 42 and the angle 16. The inner end of each of the bars 45 is slightly rounded or chamfered to prevent binding of the bar while it is being inserted, but this rounding of the end of the bar is not of such magnitude as to materially affect the seal provided by the bar.

The construction of the sealing means at one corner of the frame assembly has been illustrated and described in detail, but it is to be understood that similar sealing means is provided at each of the other corners of the frame assembly. Hence, undesired flow of gas between the various chambers defined by the dividers 15 is prevented.

The openings in the heads 11 through which the assemblies of frames 25 are inserted are closed by discs 50 which are held in place by tie rods 51 which extend between the discs on opposite ends of the unit and have nuts 52 on their exposed ends. The tie rods 51 extend through the heads 11, while the portions of the tie rods between the heads 11 extend through tubes or pipes 53 which extend between the heads 11 and are welded thereto. The pipes 53 brace the heads 11 and prevent their deformation when the nuts 52 are tightened on the tie rods 51. Furthermore, as the ends of the pipes 53 are welded to the faces of the heads 11, these pipes prevent leakage of gas through the holes in the heads 11 through which the tie rods pass.

A gasket 55 formed of compressible material, such as cork or asbestos, is mounted between each of the discs 50 and one of the heads 11, while each of the gaskets extends inwardly far enough to overlie the end plate 34 so that the gasket serves to seal the joint between a disc 50 and the head 11, and also serves to prevent undesired flow of gas around the end of the frame assembly. Each of the discs 50 has recesses in a face thereof to receive the nuts 32 and the ends of the bolts 31.

The area around each disc 50 is surrounded by a cylindrical shell 56, one end of which is welded to the face of the head 11 and the other end of which is surrounded by a flange 57 which is adapted to have secured thereto a cover plate, not shown. Each of the shells 56 is adapted to have mounted therein a pad of insulating material to prevent excessive radiation of heat from the end of the unit.

It is to be understood that the remaining surface area of the unit may be covered with suitable insulating material, not shown, to reduce radiation from the unit and thus prevent undesired condensation of the sweep medium within the unit.

The construction of one end portion of the unit has been illustrated and described in detail. The two ends are symmetrical and the construction of the other end is substantially identical with that of the end shown and described.

Each of the four chambers defined by the dividers 15 is provided with a pipe connection through which gas may be supplied to or discharged from the chamber. As shown, the cylindrical shell 10 has four openings therein, one for each of the four chambers. These openings are located substantially centrally of the chambers and each has secured therein a nipple in the form of a short length of pipe, while each of these nipples has a flange surrounding its free end so that a pipe may be detachably secured thereto. These nipples are designated 61, 62, 63, and 64 in the drawings.

Each of the chambers has therein means for distributing the flow of gas between the chamber and the associated nipple. Referring to Figs. 1 and 2 of the drawings, it will be seen that curved members 66 are secured to the interior of the shell 10 so as to enclose the openings through which the nipples 61, 62, 63, and 64 communicate with the interior of the shell 10. As is best shown in Fig. 1 of the drawings, each of the members 66 is somewhat shorter than the shell 10 so that there is a short space between each end of each of the members 66 and the adjacent head 11. The edges of the members 66 are secured to the interior of the shell 10 by any suitable means, as by welding, while the ends of the chambers formed by the members 66 and the shell 10 are closed by heads 67 which are secured in place by welding. Each of the members 66 has two rows of holes 68 therein, these holes being located near the face of the shell 10 so that gas flowing through the holes toward the frames 25 is not discharged directly at the frames 25, and so that gas discharged from the passages between the frames 25 is not discharged directly at the holes 68. The heads 67 also have a plurality of holes 68 therein. The number and size of the holes 68 are such that the total flow capacity of the holes in each of the members 66 and the associated heads 67 is relatively large. Accordingly, the velocity of the gas flowing through the holes 68 is relatively low. Furthermore, as there is no direct path for flow of gas between the holes 68 and the passages between the frames 25, the gas in each of the chambers has ample opportunity to become distributed so that the pressure on the gas is substantially uniform through the chamber.

In operation, feed gas is supplied to the diffusion unit through one of the nipples, as for example, the nipple 61, while the residual gas, that is, the portion of the feed gas remaining after removal of a component thereof by diffusion, is discharged from the unit through the nipple on the opposite side of the unit, in this case, the nipple 63. The sweep medium, which may be steam, may be supplied to the diffusion unit through the nipple 62, and the sweep medium together with the gaseous component removed from the feed gas by diffusion may be discharged from the unit through the nipple 64.

It is to be understood that the pressures of the feed gas and of the sweep medium are accurately regulated by means, not shown, so that there is very little or substantially no difference in the pressures on them.

The feed gas supplied through the nipple 61 flows through the holes 68 in the member 66 associated with the nipple 61 to the chamber at the top of the unit. One wall of this chamber is formed by the upper face of the assemblies of frames 25, and, as is clear from Figs. 4 and 5, this face of the assemblies of frames 25 consists of the solid bars or closed sides 26 on alternate frames 25, these bars or closed sides being separated by frames which have the open sides or spaced strips 27 on their upper face. Hence, the feed gas supplied to the chamber at the top of the unit will flow into the passages formed by alternate frames 25. The lower faces of the assemblies of frames 25 are similar to the upper faces, and the frames which are open at the top are also open at the bottom so that gas which flows from the chamber above the frames to the passages formed by alternate frames flows from these passages to the chamber beneath the assemblies of frames.

The side faces of the assemblies of frames also consist of the solid bars or closed sides on alternate frames 25, these bars or sides being separated by the open sides or spaced strips 27 of the intervening frames 25. As is clear from Fig. 5 of the drawings, the frames 25 which have solid bars on the top and bottom faces of the assemblies of frames have the spaced strips 27 on the side faces of these assemblies, and vice versa. Hence, the sweep gas supplied through the nipple 62 to the chamber on the left hand side of the unit flows to the passages provided by alternate frames 25, the passages through which the sweep gas flows being separated by passages containing feed gas. The sweep gas is discharged from the passages provided by the frames 25 to the chamber on the right hand side of the unit and flows therefrom through the nipple 64.

The operation of the unit is such, therefore, that feed gas flows downwardly through the passages provided by alternate frames 25, while the sweep gas flows horizontally through the passages provided by the intervening frames. The boundary sheets 35 which are clamped between adjacent frames 25 separate adjacent passages from each other and provide a porous wall through which the lightest component of the feed gas will diffuse to the sweep medium and be carried from the unit with the sweep gas. This diffusion occurs through all of the boundary sheets so diffusion takes place on both sides of each of the passages, except for the passages adjacent the plate 20 and adjacent the cover plates 50. Diffusion, therefore, occurs through the boundary sheets in multiple, and as there are a large number of boundary sheets in the unit, the total area through which diffusion takes place is relatively large. Since the amount of diffusion which occurs is proportional to the area through which diffusion can take place, and as this unit provides a large area for diffusion, the unit has large capacity even though the entire unit is compact and is relatively small in size. As the feed gas passes across the face of a boundary sheet and a component of the feed gas diffuses through the boundary sheet to the sweep medium, the concentration of this component in the feed gas decreases so there is a progressive decrease in the amount of this component diffusing through the boundary as the feed gas approaches the discharge end of a passage. Similarly, as the sweep medium passes across the face of a boundary, the concentration in the sweep gas of the component of the feed gas which diffuses through the boundary builds up and there is a gradual increase in the counter-diffusion of this component from the sweep medium side of a boundary to the feed gas side of the barrier. As the dimensions of the individual boundary sheets in this unit are relatively small, compared to the area of diffusion boundary in the unit, the path of travel of the feed gas and of the sweep gas across the face of a boundary sheet is relatively short, and these gases pass from the face of the boundary sheet before the concentration of the selected component of the feed gas decreases to an objectionable degree, or before the concentration of this component in the sweep medium increases to an objectionable degree. Hence, the unit has a high efficiency and will separate a large amount of the selected component from the feed gas.

This unit is arranged to reduce to a minimum the flow of gas through the boundary sheets due to differences in the pressure on the gas on opposite faces of these sheets. As explained above, the holes 68 in the members 66 and 67 distribute flow of gas between the inlet and outlet nipples and the faces of the assemblies of frames 25 so that pressure conditions at the faces of the assemblies of frames are substantially uniform and there are no localized high or low pressure areas which might result if gas should flow at high velocity toward or away from faces of the assemblies of frames.

It will be seen that the arrangement of the unit is such that the chambers through which gas is supplied to the passages between the boundary sheets 35, and to which the gas leaving these passages discharges, are at different faces of the rectangle defined by the frames 25. Hence, these chambers are situated directly at the ends of these passages between the frames so there is no impediment to the flow of gas between a chamber and the passages between the boundary sheets.

As the chambers associated with the two sets of passages between the boundary sheets are on different sides of a rectangle, these chambers do not interfere with each other and the chamber at each face of the rectangle may be of relatively large size with a relatively large free area so the pressure of the gas within each chamber has ample opportunity to become equalized. Hence, the pressure on the gas within the passages between the boundary sheets is substantially uniform throughout the unit.

Furthermore, the boundary sheets 35 are braced and held rigid by the cross braces 36 on the frames 25. Each of the cross braces extends between the spaced strips 27 of the associated frame. As the frame on one side of each boundary sheet 35 has its spaced strips 27 at the side faces of the assembly of frames, and as the frame at the other side of the same boundary sheet has its spaced strips 27 at the top and bottom faces of the assembly of frames, it follows that the cross brace 36 on one face of each boundary sheet extends in a horizontal direction and the cross brace 36 on the other face of this boundary sheet extends in a vertical direction. The edges of the cross braces 36 engage the faces of the boundary sheets, and as the braces on opposite sides of each boundary sheet extend at right angles to each other, the braces are very effective in holding the boundary sheets rigid and flat. Hence, there is no possibility that the flow of gas through a passage between boundary sheets will be disturbed by vibration of the boundary sheets or by variation in the size of the passage because of bulging of a boundary sheet.

As pointed out above, the cross brace 36 associated with each frame 25 extends between the spaced strips 27 of that frame. Hence, each of the cross braces 36 extends substantially parallel to the direction of flow of gas through the frame with which the brace is associated and the braces do not interfere with the flow of gas through the frames and do not cause to be developed eddy currents or irregular flow conditions which might result in local differences in the pressure on the gas at the face of a boundary sheet. Accordingly, the flow of gas across the faces of the boundaries is substantially uninterrupted and at a uniform rate so the passage of gas through the boundary sheets is almost entirely the result of diffusion. This is advantageous since the flow of gas through the boundary sheets because of differences in the pressure on opposite sides of a boundary will result in the flow of the entire body of the feed gas to the sweep gas side of the boundary, thus contaminating the selected constituent of the feed gas with other elements of the feed gas.

In the unit illustrated, the boundary sheets are arranged so as to be substantially vertical. This is advantageous as any moisture which condenses from the sweep medium and is deposited on a boundary sheet will drain off. This is desirable because if the moisture should remain on the boundary sheet, it would prevent diffusion through the area covered by the moisture and thus reduce the capacity of the unit. Similarly, as the boundary sheets are vertical, any dirt or foreign material carried into the unit by the feed gas or by the sweep medium will not be deposited on the boundary where it might reduce the effective area of these sheets.

In the unit shown in Figs. 1 and 2, the frames 25 are square so the path of travel of the feed gas and of the sweep medium across the boundary sheets is the same length. Under some conditions, it may be desirable to have the path of travel of the gases on opposite sides of the boundary sheets unequal, and the construction of this unit is such that this arrangement can be provided if it is desired, and Fig. 7 illustrates such a modification. Referring to Fig. 7 of the drawings, it will be seen that the unit 10a therein illustrated is similar in design and construction to the unit shown in Fig. 2, but that the unit shown in Fig. 7 differs from that shown in Fig. 2 in that the frames 25a employed in the unit shown in Fig. 7 are oblong instead of square, while the internal construction of the unit is arranged so that the unit is adapted to receive the oblong frames.

The frames 25a employed in the unit shown in Fig. 7 are supplied in two types, one type having closed sides in the form of solid bars on the long sides of the frames and open sides in the form of spaced strips on the short sides of the frames. The other type has spaced strips on the long sides of the frames and has solid bars on the short sides of the frames. The frames 25a are assembled so that adjacent frames are of different types, and to insure that they will be arranged in this manner, the frames 25a may be provided with indexing means in the form of recesses and projecting pins similar to those provided on the frames 25 so that the spaced strips of a frame can only be placed against the solid bars of an adjoining frame.

It will be seen that where the modified unit 10a shown in Fig. 7 is employed, the gas which flows through the unit in a horizontal direction has a much longer path of contact with the faces of the boundary sheets than the gas which travels vertically through the unit.

If the sweep gas flows horizontally and the feed gas flows vertically through the unit, the sweep gas will have a prolonged opportunity to receive gas by diffusion through the boundaries, while the feed gas will remain in contact with the boundaries only a short time so that the feed gas passes from the diffusion area before the concentration of the selected component of the feed gas has been materially reduced by passage of this component through the boundary. Accordingly, the feed gas in contact with the diffusion boundaries always has a relatively high concentration of the selected component, so the rate of diffusion is relatively high and the unit operates to extract a maximum amount of the desired component for a given consumption of sweep medium, but only a small part of the selected component is extracted from the feed gas.

On the other hand, if the feed gas flows horizontally and the sweep medium flows vetrically through the unit, the feed gas will remain in contact with the boundaries for a relatively long time so that the selected component of the gas has prolonged opportunity to pass through the boundaries and the concentration of this component in the feed gas is reduced to a low level. Under these conditions, the sweep medium will remain in the diffusion area for only a short time so the concentration of the selected component of the feed gas does not build up to a very high value and there is little counter-diffusion of this component from the sweep medium to the feed gas. Hence, this arrangement results in relatively complete removal of the selected component from the feed gas, but requires a large amount of sweep gas.

It is obvious that by varying the dimensions of the frames the length of path of travel of the feed or of the sweep gas across the boundary sheets may be varied as desired. Furthermore, either dimension of the frames may be varied without affecting the other dimension. Thus, the frames may be made wider without affecting their length, or their length may be changed without affecting their width. As the gas on one side of a boundary flows in one direction, and the gas on the other side of the boundary flows at right angles thereto, and as the length and width of the frames may be independently varied, it follows that the length of the path of travel of the feed gas, or of the sweep medium, across the face of the diffusion boundary may be adjusted to provide the most efficient operation.

In the description of the operation of the unit shown in Figs. 1 and 2 of the drawings, the feed gas has been stated to flow vertically downward through the unit, and the sweep gas has been stated to flow horizontally through the unit. However, the unit is not limited to this method of operation and in some cases a different arrangement for the flow of gases may be advantageous.

In a diffusion unit, if there is any material difference in the pressures on the gases on opposite sides of a diffusion boundary, there will be a mass flow of gas through the boundary from the side of the boundary at which the pressure is the higher to the side at which the pressure is the lower. This mass flow of gas through he diffusion boundary, if it occurs, will result in objectionable flow of the sweep gas into the feed gas, or in objectionable flow of all of the components of the feed gas into the sweep gas.

The pressure on a gas at the face of a boundary sheet is not uniform over the entire surface-area of the boundary sheets, but is affected by the weight of the gas in the passage between boundary sheets, and by the difference in pressure on the gas at opposite edges of the boundary necessary to cause flow of gas through the unit. Although the vertical extent of the frames 25 is not very great, about one foot in a typical unit, with the result that the passages between the frames 25 are only about one foot high, the weight of a static column of gas of this depth is enough to cause the pressure on the gas adjacent the bottom of the passage to be appreciably higher than the pressure on the gas adjacent the top of the passage. The weight of such a column of gas varies with the composition of the gas, so the weight of a column of sweep gas, and of a column of feed gas, will be somewhat different since these gases are of different composition. Accordingly, even though the pressures of the sweep and feed gases are accurately regulated, there will be a small difference in the pressure on the gases on opposite sides of the lower part of a boundary, when these gases are static, and this pressure difference may be enough to cause objectionable mass flow of gas through the diffusion boundaries.

In order to effect flow of gas through the unit it is necessary for the pressure on the gas at the inlet of a passage to be somewhat higher than the pressure on the gas at the outlet of the passage, and there is a gradual decrease in the pressure between the inlet and outlet ends of a passage. This difference in pressure on the gas as it flows through the diffusion unit may be employed to offset the difference in the pressure on a gas at different vertical levels in the unit because of the weight of the gas.

If the flow of gases through the diffusion unit is arranged so that the relatively heavy gas flows vertically downward through the unit, the increase in the pressure on the gas near the bottom of the unit, because of the weight of the gas, is offset by the reduction in the pressure on this gas because of the gradual reduction in the gas as it approaches the outlet of the passage. The difference between the pressure of the gas at the inlet and at the outlet of the passage may be regulated so that it is large or small as desired, and in this manner the effect of the weight of the gas on the pressure at different vertical levels may be partially or completely offset.

In like manner, the pressure difference between the inlet and outlet of the passage may be employed to augment the difference in pressure on one of the gases at different vertical levels in the unit. If the unit is arranged so that the gas which flows vertically through the unit enters at the bottom of the unit and leaves at the top of the unit, the pressure difference between the inlet and outlet of the passage will supplement the pressure difference caused by the weight of the gas. This arrangement is advantageous where the gas which flows horizontally through the unit is relatively heavy so that there is substantially greater pressure on this gas adjacent the bottoms of the passages through which it flows than adjacent the tops of these passages.

Although I have illustrated and described one form of improved diffusion unit embodying my invention, together with a modification thereof which I may employ, it is to be understood that the invention is not limited to the details illustrated and described and that numerous changes and modifications may be made without departing from the spirit and scope of the following claims.

The preferred form of the invention having been thus described, what is claimed is:

1. In a diffusion apparatus, the combination of an elongated shell with its long axis horizontally disposed, gas-tight end closure means for said shell, four radially inwardly extending baffles spaced equiangularly around said axis and within said shell, said baffles extending for substantially the entire horizontal extent of said shell and being affixed to the inner periphery thereof in gas-tight relation, frame-supporting and positioning means extending in a horizontal direction at the edges of each of said baffles adjacent the axis of the shell, said means supporting a plurality of vertically disposed rectangular frames adapted to slide in said frame-supporting means, each of said frames comprising two elongated parallel solid bars as two sides and four spaced parallel thin metal strips at the ends of and normal to the longitudinal axes of said bars, each strip extending from one end of one bar to an adjacent end of the second bar and secured to both bars by tie bolts so that said frames are open to gas flow solely in a direction parallel to the longitudinal axes of said bars and between said strips, said frames being arranged in two sets such that alternate frames constituting the second set of frames are positioned so as to be open to gas flow in a direction normal to the flow of gas in the first set of frames, a plurality of parallel substantially rectangular thin foraminous boundary sheets mounted between adjacent frames, sealing means to prevent gas flow from one frame into the frames adjacent thereto except through said boundaries, process gas inlet and outlet means communicating with diametrically opposite chambers formed by said baffles and said shell, and sweep gas inlet and outlet means communicating with the remaining two diametrically opposed chambers formed by said baffles and shell.

2. In a diffusion apparatus, the combination of an elongated shell with its long axis horizontally disposed, gas-tight end closure means for said shell, four radially inwardly extending baffles spaced equiangularly around said axis and within said shell, said baffles extending for substantially the entire horizontal extent of said shell and being affixed to the inner periphery thereof in gas-tight relation, frame-supporting and positioning means extending in a horizontal direction at the edges of each of said baffles adjacent the axis of the shell, said means supporting a plurality of vertically disposed rectangular frames adapted to slide in said frame-supporting means, each of said frames comprising two elongated parallel solid bars as two sides and four spaced parallel thin metal strips at the ends of and normal to the longitudinal axes of said bars, each strip extending from one end of one bar to an adjacent end of the second bar and secured to both bars by tie bolts so that said frames are open to gas flow solely in a direction parallel to the longitudinal axes of said bars and between said strips, said frames being arranged in two sets such that alternate frames constituting the second set of frames are positioned so as to be open to gas flow in a direction normal to the flow of gas in the first set of frames, a plurality of parallel substantially rectangular thin foraminous boundary sheets mounted between adjacent frames, sealing means to prevent gas flow from one frame into the frames adjacent thereto except through said boundaries, gas manifolds in each of the chambers formed by said baffles and shell, said manifolds being adapted to provide equal flow of gas through each frame of one of said sets, process gas inlet and outlet means communicating with gas manifolds in a diametrically opposite pair of said chambers, and sweep gas inlet and outlet means communicating with the manifolds in the remaining pair of diametrically opposed chambers.

3. In a diffusion apparatus, the combination of an elongated shell with its long axis horizontally disposed, gas-tight end closure means for said shell, four radially inwardly extending baffles spaced equiangularly around said axis and within said shell, said baffles extending for substantially the entire horizontal extent of said shell and being affixed to the inner periphery thereof in gas-tight relation, frame-supporting and positioning means extending in a horizontal direction at the edges of each of said baffles adjacent the axis of the shell, said means supporting a plurality of vertically disposed rectangular frames adapted to slide in said frame-supporting means, each of said frames comprising two elongated parallel solid bars as two sides and four spaced parallel thin metal strips at the ends of and normal to the longitudinal axes of said bars, each strip extending from one end of one bar to an adjacent end of the second bar and secured to both bars by tie bolts so that said frames are open to gas flow solely in a direction parallel to the longitudinal axes of said bars and between said strips, said frames being arranged in two sets such that alternate frames constituting the second set of frames are positioned so as to be open to gas flow in a direction normal to the flow of gas in the first set of frames, a plurality of parallel substantially rectangular thin foraminous boundary sheets mounted between adjacent frames, indexing means associated with said frames comprising pins projecting from the open sides of the frames into recesses in the closed sides of the adjacent frames, sealing means to prevent gas flow from one frame into the frames adjacent thereto except through said boundaries, process gas inlet and outlet means communicating with diametrically opposite chambers formed by said baffles and said shell, and sweep gas inlet and outlet means communicating with the remaining two diametrically opposed chambers formed by said baffles and shell.

4. In a diffusion apparatus, the combination of an elongated shell with its long axis horizontally disposed, gas-tight end closure means for said shell, four radially inwardly extending baffles spaced equiangularly around said axis and within said shell, said baffles extending for substantially the entire horizontal extent of said shell and being affixed to the inner periphery thereof in gas-tight relation, frame-supporting and positioning means extending in a horizontal direction at the edges of each of said baffles adjacent the axis of the shell, said means supporting a plurality of vertically disposed rectangular frames adapted to slide in said frame-supporting means, each of said frames comprising two elongated parallel solid bars as two sides and four spaced parallel thin metal strips at the ends of and normal to the longitudinal axes of said bars, each strip extending from one end of one bar to an adjacent end of the second bar and secured to both bars by tie bolts so that said frames are open to gas flow solely in a direction parallel to the longitudinal axes of said bars and between said strips, said frames being arranged in two sets such that alternate frames constituting the second set of frames are positioned so as to be open to gas flow in a direction normal to the flow of gas in the first set of frames, a plurality of parallel substantially rectangular thin foraminous boundary sheets mounted between adjacent frames, said frames being spaced a small distance from the vertical faces of the supporting and positioning means, horizontally elongated elastic gaskets engaging an outermost portion of each corner of said frames, grooved horizontally elongated bars with smooth faces engaging each of said gaskets, a removable horizontally elongated rod engaging a horizontal groove in each of the vertical faces of the positioning and supporting means and the grooves in each of said bars, process gas inlet and outlet means communicating with diametrically opposite chambers formed by said baffles and said shell, and sweep gas inlet and outlet means communicating with the remaining two diametrically opposed chambers formed by said baffles and shell.

5. In a diffusion apparatus, the combination of an elongated shell with its long axis horizontally disposed, four radially inwardly extending baffles spaced equiangularly around said axis and within said shell, said baffles extending for substantially the entire horizontal extent of said shell and being affixed to the inner periphery thereof in gas-tight relation, frame-supporting and positioning means extending in a horizontal direction at the edges of each of said baffles adjacent the axis of the shell, said means supporting a plurality of vertically disposed rectangular frames adapted to slide in said frame-supporting means, each of said frames comprising two elongated parallel solid bars as two sides and four spaced parallel thin metal strips at the ends of and normal to the longitudinal axes of said bars, each strip extending from one end of one bar to an adjacent end of the second bar and secured to both bars by tie bolts so that said frames are open to gas flow solely in a direction parallel to the longitudinal axes of said bars and between said strips, said frames being arranged in two sets such that alternate frames constituting the second set of frames are positioned so as to be open to gas flow in a direction normal to the flow of gas in the first set of frames, a plurality of parallel substantially rectangular thin foraminous boundary sheets mounted between adjacent frames, sealing means to prevent gas flow from one frame into the frames adjacent thereto except through said boundaries, closure plates affixed to the ends of said shell and to said baffles in gas-tight relation, said plates being apertured to permit removal of said frames as a unit, elastic gaskets and detachable cover plates covering said apertures, process gas inlet and outlet means communicating with diametrically opposite chambers formed by said baffles and said shell, and sweep gas inlet and outlet means communicating with the remaining two diametrically opposed chambers formed by said baffles and shell.

6. In a diffusion apparatus, the combination of an elongated shell with its long axis horizontally disposed, gas-tight end closure means for said shell, four radially inwardly extending baffles spaced equiangularly around said axis and within said shell, said baffles extending for substantially the entire horizontal extent of said shell and being affixed to the inner periphery thereof in gas-tight relation, frame-supporting and positioning means extending in a horizontal direction at the edges of each of said baffles adjacent the axis of the shell, said means supporting a plurality of vertically disposed rectangular frames adapted to slide in said frame-supporting means, each of said frames comprising two elongated parallel solid bars as two sides and four spaced parallel thin metal strips at the ends of and normal to the longitudinal axes of said bars, each strip extending from one end of one bar to an adjacent end of the second bar and secured to both bars by tie bolts so that said frames are open to gas flow solely in a direction parallel to the longitudinal axes of said bars and between said strips, said frames being arranged in two sets such that alternate frames constituting the second set of frames are positioned so as to be open to gas flow in a direction normal to the flow of gas in the first set of frames, a plurality of parallel substantially rectangular thin foraminous boundary sheets mounted between adjacent frames, sealing means to prevent gas flow from one frame into the frames adjacent thereto except through said boundaries, elongated braces mounted in the spaces between the sheets at the central portions of the sheets and arranged to engage each of said sheets on each side thereof, said braces being positioned alternately at right angles so as to be in the direction of gas flow, process gas inlet and outlet means communciating with diametrically opposite chambers formed by said baffles and said shell, and sweep gas inlet and outlet means communicating with the remaining two diametrically opposed chambers formed by said baffles and shell.

EARL V. HARLOW.

REFERENCES CITED

The following references are of record in the file of this patent:

UNITED STATES PATENTS

| Number | Name | Date |
|---|---|---|
| 1,496,757 | Lewis et al. | June 3, 1924 |
| 1,966,034 | Hensler | July 10, 1934 |
| 2,225,024 | Weber | Dec. 17, 1940 |
| 2,226,337 | Casey | Dec. 24, 1940 |